United States Patent
Shi et al.

(10) Patent No.: US 12,449,696 B2
(45) Date of Patent: Oct. 21, 2025

(54) BACKLIGHT MODULE, DISPLAY DEVICE AND ASSEMBLED DISPLAY DEVICE

(71) Applicants: Beijing BOE Display Technology Co., Ltd., Beijing (CN); BOE Technology Group Co., Ltd., Beijing (CN)

(72) Inventors: Haijun Shi, Beijing (CN); Changjia Fu, Beijing (CN); Bochang Wang, Beijing (CN); Zhanchang Bu, Beijing (CN); Hongbo Feng, Beijing (CN); Zhuang Xu, Beijing (CN)

(73) Assignees: Beijing BOE Display Technology Co., Ltd., Beijing (CN); Beijing BOE Technology Development Co., Ltd., Beijing (CN)

( * ) Notice: Subject to any disclaimer, the term of this patent is extended or adjusted under 35 U.S.C. 154(b) by 0 days.

(21) Appl. No.: 18/692,271

(22) PCT Filed: Jul. 13, 2023

(86) PCT No.: PCT/CN2023/107330
§ 371 (c)(1),
(2) Date: Mar. 14, 2024

(87) PCT Pub. No.: WO2024/022125
PCT Pub. Date: Feb. 1, 2024

(65) Prior Publication Data
US 2025/0147359 A1 May 8, 2025

(30) Foreign Application Priority Data
Jul. 27, 2022 (CN) .......................... 202210892030.2

(51) Int. Cl.
*G02F 1/13357* (2006.01)

(52) U.S. Cl.
CPC .. *G02F 1/133608* (2013.01); *G02F 1/133606* (2013.01); *G02F 1/133611* (2013.01)

(58) Field of Classification Search
CPC ............. G02B 6/0078; G02F 1/133608; G02F 1/133606; G02F 1/133611; G02F 1/133617; G02F 1/133317; G02F 1/133603
See application file for complete search history.

(56) References Cited

U.S. PATENT DOCUMENTS

| | | | |
|---|---|---|---|
| 2014/0204281 A1* | 7/2014 | Maeda | H04N 5/645 348/794 |
| 2017/0315408 A1 | 11/2017 | Lee et al. | |

(Continued)

FOREIGN PATENT DOCUMENTS

| | | |
|---|---|---|
| CN | 106803400 A | 6/2017 |
| CN | 109471293 A | 3/2019 |

(Continued)

OTHER PUBLICATIONS

PCT/CN2023/107330 international search report (corrected) dated Nov. 27, 2023.
PCT/CN2023/107330 Written Opinion dated Aug. 18, 2023.

*Primary Examiner* — Erin Kryukova
(74) *Attorney, Agent, or Firm* — IPro, PLLC

(57) ABSTRACT

The present disclosure provides a backlight module, a display device and an assembled display device. The backlight module includes: a backplate (1), including a bottom wall (101); a light source (3), disposed on the bottom wall (1); an optical film layer, disposed opposite to the bottom wall (101) and located on a light emitting side of the light source (3); a middle frame, including a first frame body (4) and a second frame body (5), where the first frame body (4) is arranged around periphery of the bottom wall (101), the second frame body (5) is arranged on an inner side surface of the first (Continued)

frame body (4), and the second frame body (5) includes a transparent structure; and the optical film layer (6) is supported at one end of the second frame body (5) away from the bottom wall (101). The present disclosure can improve display effect.

15 Claims, 9 Drawing Sheets

(56) References Cited

U.S. PATENT DOCUMENTS

| | | | | |
|---|---|---|---|---|
| 2017/0322443 A1* | 11/2017 | Han | ................... | G02F 1/133608 |
| 2019/0204684 A1* | 7/2019 | Yoon | ................. | G02F 1/133606 |
| 2020/0310198 A1* | 10/2020 | Li | ..................... | G02F 1/133606 |
| 2021/0041739 A1* | 2/2021 | Hwang | ............. | G02F 1/133608 |
| 2021/0181582 A1* | 6/2021 | Yoon | ................... | G02F 1/13336 |

FOREIGN PATENT DOCUMENTS

| | | |
|---|---|---|
| CN | 209690674 U | 11/2019 |
| CN | 114399959 A | 4/2022 |
| CN | 216561308 U | 5/2022 |
| CN | 115167033 A | 10/2022 |
| WO | 2021185270 A1 | 9/2021 |

\* cited by examiner

BACKLIGHT MODULE, DISPLAY DEVICE AND ASSEMBLED DISPLAY DEVICE

CROSS-REFERENCE TO RELATED APPLICATIONS

This application is a national stage of international PCT Application No. PCT/CN2023/107330 filed on Jul. 13, 2023, the entire contents of which are incorporated herein by reference.

TECHNICAL FIELD

The present disclosure relates to the field of display technology, and in particular, to a backlight module, a display device and an assembled display device.

BACKGROUND

With the development of science and technology, assembled display devices are increasingly widely used. An assembled display device is usually formed by assembling a plurality of independent display devices, and each independent display device includes a display panel and a backlight module. However, this display device has a low display effect.

SUMMARY

A purpose of the present disclosure is to provide a backlight module, a display device and an assembled display device, which can improve technical effects.

According to an aspect of the present disclosure, a backlight module is provided, including:
- a backplate, including a bottom wall;
- a light source, disposed on the bottom wall;
- an optical film layer, disposed opposite to the bottom wall and located on a light emitting side of the light source; and
- a middle frame, including a first frame body and a second frame body, where the first frame body is arranged around periphery of the bottom wall, the second frame body is arranged on an inner side surface of the first frame body, and the second frame body includes a transparent structure; and the optical film layer is supported at one end of the second frame body away from the bottom wall.

Further, the inner side surface of the first frame body includes a first slope, an included angle between the first slope and the bottom wall of the backplate is an obtuse angle, and the second frame body is disposed on the first slope.

Further, the second frame body is bonded to the first slope.

Further, the first slope is provided with a recessed portion, the second frame body is provided with a protruding portion, and the protruding portion is engaged with the recessed portion.

Further, an inner side surface of the first frame body further includes a second slope, the second slope is located between the first slope and the bottom wall of the backplate, an included angle between the second slope and the bottom wall of the backplate is an obtuse angle, and the included angle between the second slope and the bottom wall of the backplate is smaller than the included angle between the first slope and the bottom wall of the backplate.

Further, in a direction parallel to the bottom wall of the backplate, the first slope is located on a side of the second slope away from the light source; the inner side surface of the first frame body further includes a connecting surface connecting the first slope and the second slope, and the connecting surface is parallel to the bottom wall of the backplate; and the second frame body fits with the connecting surface.

Further, the end of the second frame body away from the bottom wall of the backplate is provided with a support surface, and the optical film layer is supported on the support surface; and the second frame body further includes:
- a protrusion, disposed on the support surface, where the protrusion includes a first side surface facing the light source and a second side surface facing away from the light source, an included angle between the first side surface and the bottom wall of the backplate is an obtuse angle, and an included angle between the second side surface and the bottom wall of the backplate is an acute angle.

Further, the included angle between the first side surface and the bottom wall of the backplate ranges between 120°-150°.

Further, the protrusion is strip-shaped and extends along periphery of the light source.

Further, a height of the protrusion ranges between 50 μm-200 μm; and/or
a width of the protrusion ranges between 50 μm-400 μm.

Further, where the end of the second frame body away from the bottom wall of the backplate is provided with a support surface, and the optical film layer is supported on the support surface; and a distance between a boundary of the support surface close to the light source and a boundary of the support surface away from the light source ranges between 2 mm-3.5 mm.

Further, the second frame body includes an annular structure.

Further, a material of the second frame body includes transparent plastic.

Further, where an end of the first frame body away from the bottom wall of the backplate is provided with a support portion for supporting a display panel, and the support portion includes a first surface facing the light source and a second surface facing away from the light source; a side of the first surface close to the display panel is bent toward the second surface.

Further, a distance between the side of the first surface close to the display panel and a side of the second surface close to the display panel ranges between 0.2 mm-0.5 mm.

According to an aspect of the present disclosure, a display device is provided, including:
- the backlight module;
- a display panel, supported on the first frame body.

According to an aspect of the present disclosure, an assembled display device is provided, where the assembled display device is formed by assembling a plurality of display devices.

According to the backlight module, the display device and the assembled display device of the present disclosure, the light source is arranged on the bottom wall, the first frame body is arranged around the periphery of the bottom wall, the second frame body is arranged on the inner side surface of the first frame body, the second frame body includes a transparent structure, and the optical film layer is supported at the end of the second frame body away from the bottom wall, so that light emitted by the light source can pass through the second frame body and reach an area of the optical film layer supported by the second frame body, a portion of the display panel corresponding to this area is prevented from darkening, and the display effect is improved.

Figure 1:
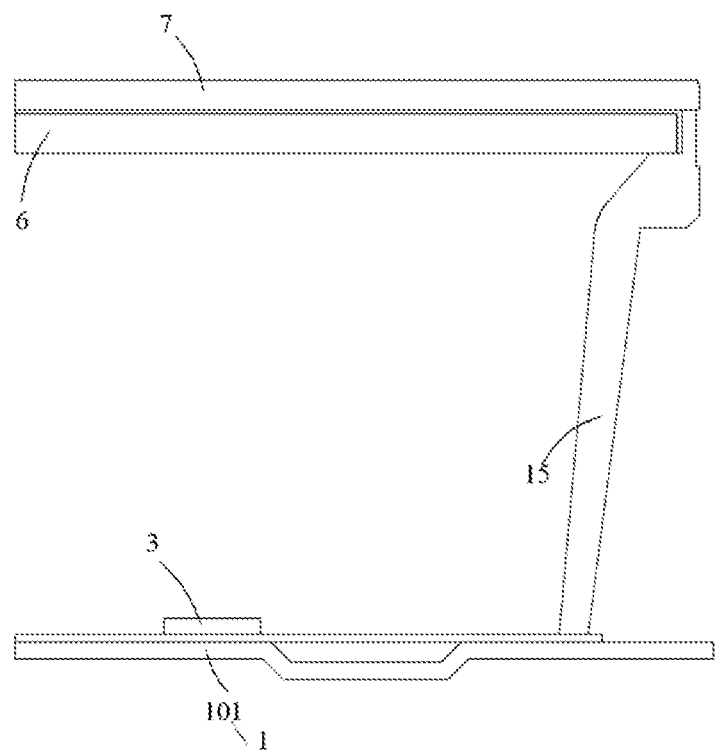
FIG. 1 is a schematic diagram of a display device in related arts.

REFERENCE NUMERALS 1, backplate; 101, bottom wall; 102, side wall; 2, reflective film; 3, light source; 4, first frame body; 401, first slope; 402, second slope; 403, connecting surface; 404, recessed portion; 5, second frame body; 501, third slope; 502, fourth slope; 503, support surface; 504, protruding portion; 6, optical film layer; 7, display panel; 8, support portion; 801, first surface; 802, second surface; 9, adhesive; 10, screw; 11, front frame; 12, protrusion; 1201, first side surface; 1202, second side surface; 13, assembled seam; 14, cover plate; 15, middle frame.

DETAILED DESCRIPTION

Description will now be made in detail to illustrative embodiments, examples of which are shown in the accompanying drawings. When the following description refers to the drawings, unless otherwise indicated, same reference numerals in different drawings indicate the same or similar elements. Embodiments described in the following illustrative embodiments do not represent all embodiments consistent with the present disclosure. In contrary, they are merely examples of apparatuses consistent with some aspects of the present disclosure as described in detail in the appended claims.

The terminologies used in the present disclosure are for the purpose of describing specific embodiments only and are not intended to limit the present disclosure. Unless otherwise defined, technical terms or scientific terms used in the present disclosure shall have their ordinary meanings as understood by those of ordinary skills in the field to which the present disclosure belongs. The "first", "second" and similar words used in the specification and claims of the present disclosure do not indicate any order, quantity or importance, but are only used to distinguish different components. Similarly, similar words such as "a" or "an" do not mean quantity limitation, but mean that there is at least one. "Multiple" or "a plurality of" means two or more. Unless otherwise specified, similar words such as "front", "rear" "lower" and/or "upper" are only for convenience of explanation, and are not limited to a position or a spatial orientation. Similar words such as "include" or "comprise" mean that the elements or objects appear before "include" or "comprise" cover the elements or objects listed after "include" or "comprise" and their equivalents, but do not exclude other elements or objects. Similar words such as "connect" or "couple" are not limited to physical or mechanical connection, but may include electrical connection, whether direct or indirect. Singular forms "a", "the" and "said" used in the specification of the present disclosure and the appended claims are also intended to include plural forms, unless the context clearly indicates other meaning. It should also be understood that the term "and/or" as used herein refers to and includes any or all possible combinations of one or more associated listed items.

Figure 2:
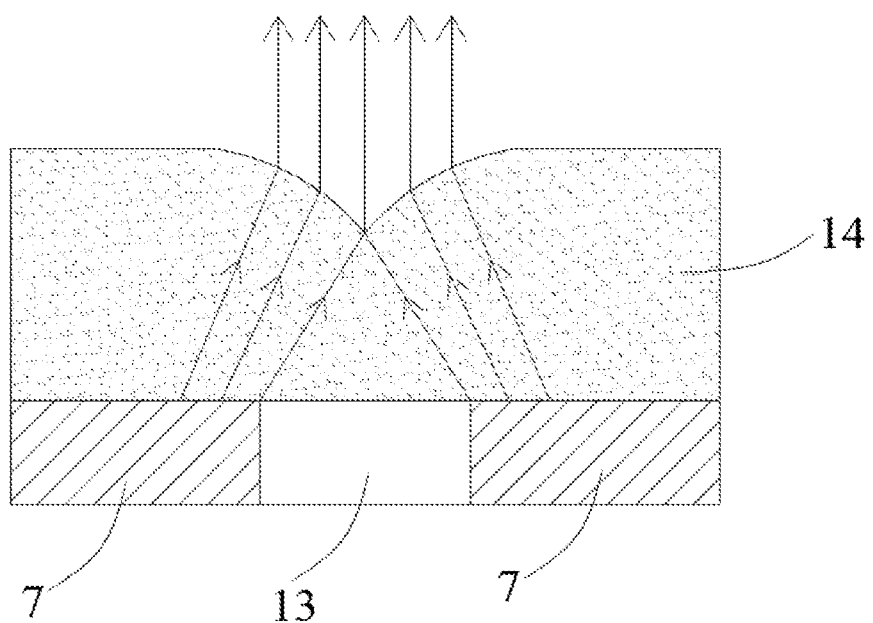
FIG. 2 is a light emitting schematic diagram of an assembled display device in related arts.

In related arts, as shown in FIG. 1, the display device includes a backplate 1, a middle frame 15, an optical film layer 6, and a display panel 7, where the optical film layer 6 is supported on the middle frame 15, a bottom wall 101 of the backplate 1 is provided with a light source 3, in order to avoid side light leakage of the backlight module, the middle frame 15 needs to be provided with a non-transparent structure, however, this causes that lights cannot pass through an area of the optical film layer 6 supported by the middle frame 15, hence a portion of the display panel 7 corresponding to this area is relatively dark, a "dark frame" problem is generated and a display effect is reduced. As shown in FIG. 2, an assembled display device includes a plurality of display panels 7, and there is an assembling seam 13 between adjacent display panels 7, in order to weaken the assembling seam 13 and achieve a visual frameless effect, a cover plate 14 with an arc surface is used, so that light emitted from edges of the display panels 7 enters human eyes after being refracted by the arc surface of the cover plate 14, thereby weakening the assembling seam 13. Since lights cannot pass through the area of the optical film layer 6 supported by the middle frame 15 in FIG. 1, a portion of the display panel 7 corresponding to the region is relatively dark, which causes that the assembled display device formed by assembling the display devices shown in FIG. 1 cannot weaken the assembling seam 13, and cannot achieve the visual frameless effect.

Figure 3:
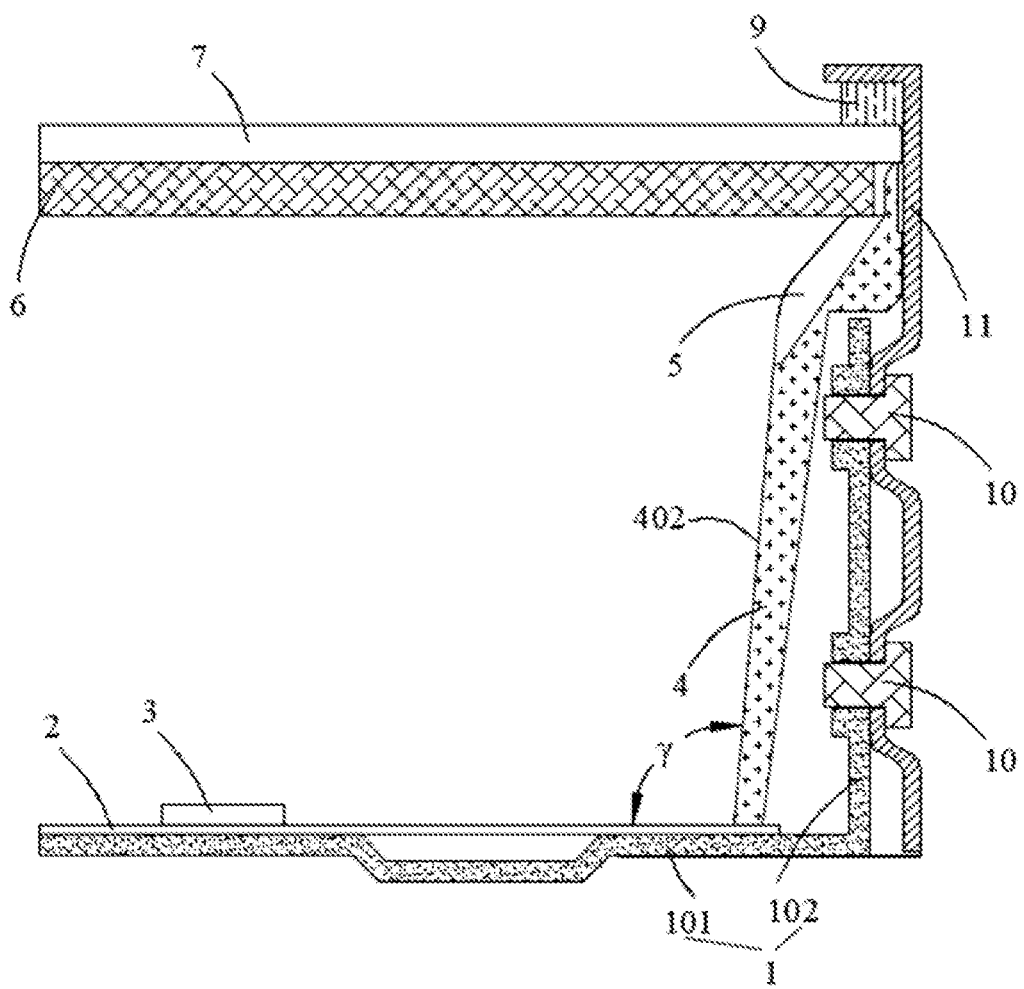
FIG. 3 is a schematic diagram of a display device according to an embodiment of the present disclosure.
Figure 4:
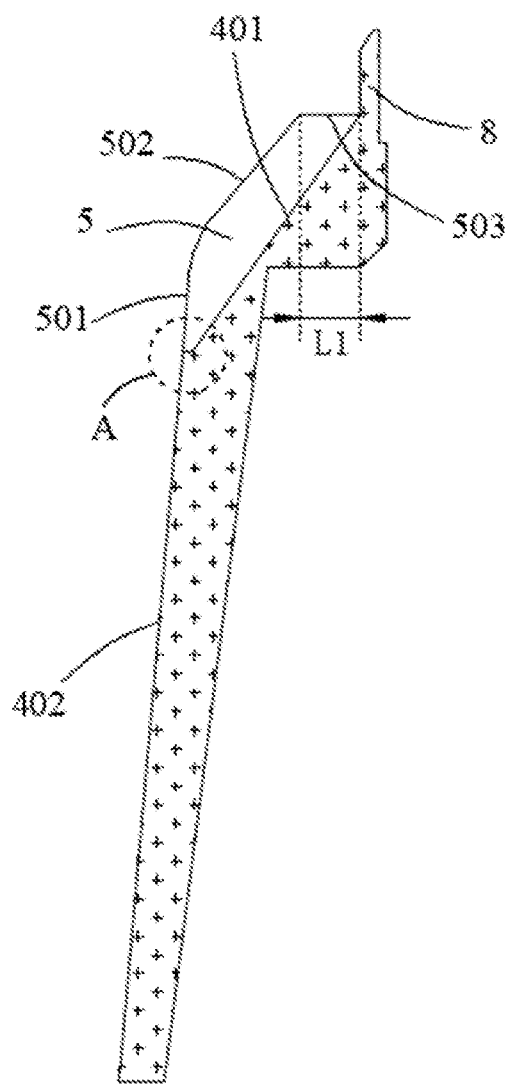
FIG. 4 is a schematic diagram of a middle frame according to an embodiment of the present disclosure.

Embodiments of the present disclosure provide a backlight module, applied for a display panel. As shown in FIG. 3 and FIG. 4, the backlight module may include a backplate 1, a light source 3, an optical film layer 6 and a middle frame.

The backplate 1 includes a bottom wall 101. The light source 3 is disposed on the bottom wall 101. The optical film layer 6 is disposed opposite to the bottom wall 101 and is located on a light emitting side of the light source 3. The middle frame includes a first frame body 4 and a second frame body 5. The first frame body 4 is disposed around periphery of the bottom wall 101, the second frame body 5 is disposed on an inner side surface of the first frame body 4, and the second frame body 5 includes a transparent structure. The optical film layer 6 is supported at an end of the second frame body 5 away from the bottom wall 101.

In the backlight module of the present disclosure, the light source 3 is disposed on the bottom wall 101, the first frame body 4 is disposed around periphery of the bottom wall 101, the second frame body 5 is disposed on an inner side surface of the first frame body 4, the second frame body 5 includes a transparent structure, and the optical film layer 6 is supported at an end of the second frame body 5 away from the bottom wall 101. In this way, the light emitted by the light source 3 can pass through the second frame body 5 and reach an area of the optical film layer 6 supported on the second frame body 5, thus preventing a portion of the display panel 7 corresponding to this area from darkening, and improving the display effect. At the same time, after the display devices with the backlight module form the assembled display device, the visual frameless effect can be realized.

Various parts of the backlight module according to the embodiments of the present disclosure will be described in detail below.

The backplate 1 may include a bottom wall 101, and certainly, may also include a side wall 102 disposed on the bottom wall 101. The bottom wall 101 may be disposed opposite to a display panel 7. The side wall 102 is connected to a side of the bottom wall 101 facing the display panel 7. The side wall 102 may be perpendicular to the bottom wall 101, but the present disclosure is not particularly limited thereto. A light source 3 is disposed on the side of the bottom wall 101 facing the display panel 7. There may be a plurality of light sources 3, and the plurality of light sources 3 may be distributed in an array, but the embodiments of the present disclosure are not limited thereto. The backlight module of the embodiment of the present disclosure may further include a reflective film 2. The reflective film 2 may be disposed on a surface of the bottom wall 101 facing the display panel 7, and the light source 3 may be disposed on a side of the reflective film 2 facing away from the bottom wall 101.

The middle frame may include a first frame body 4. The first frame body 4 may be connected to the bottom wall 101 of the backplate 1, for example, the first frame body 4 is in threaded connection with the bottom wall 101 of the backplate 1, and for another example, the first frame body 4 may be engaged with the bottom wall 101 of the backplate 1. The first frame body 4 may be disposed around periphery of the bottom wall 101 of the backplate 1, that is, the first frame body 4 has an annular structure. In addition, the sidewall 102 of the backplate 1 may surround the first frame body 4, and the light source 3 is also located in an area surrounded by the first frame body 4. The first frame body 4 may include a non-transparent structure, which may prevent light emitted by the light source 3 from passing through the first frame body 4. Specifically, the material of the first frame body 4 may be plastic, but is not limited thereto, and may also be aluminium, etc.

Figure 5:
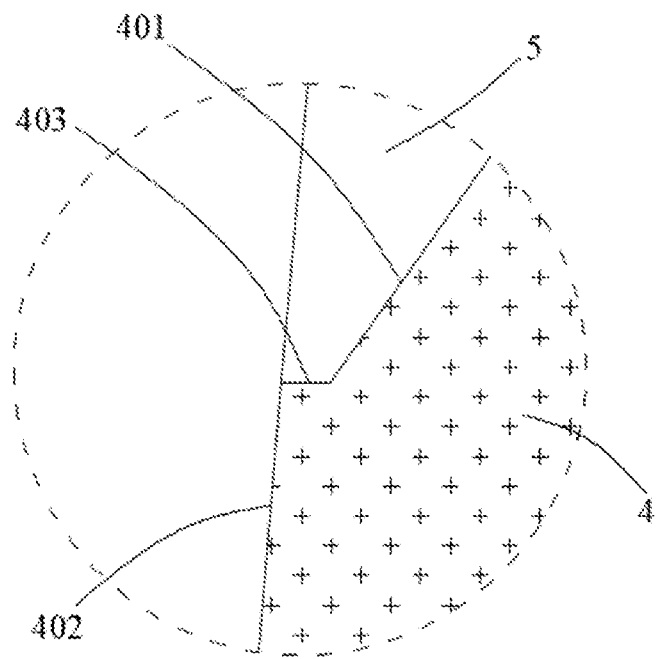
FIG. 5 is an enlarged view of part A of the structure shown in FIG. 4.
Figure 9:
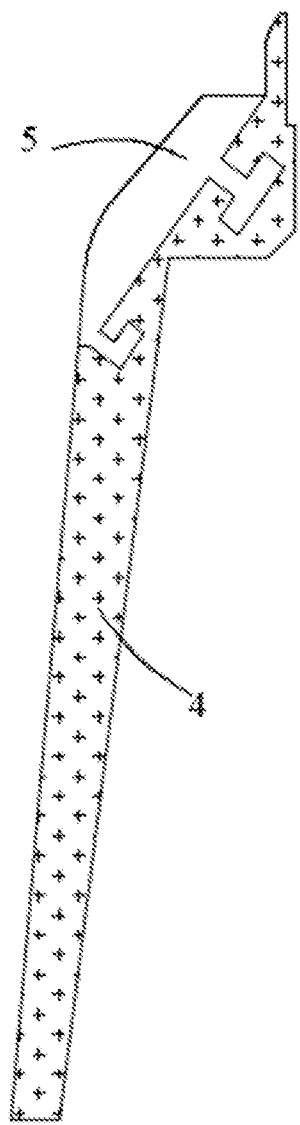
FIG. 9 is another schematic diagram of a middle frame according to an embodiment of the present disclosure.
Figure 10:
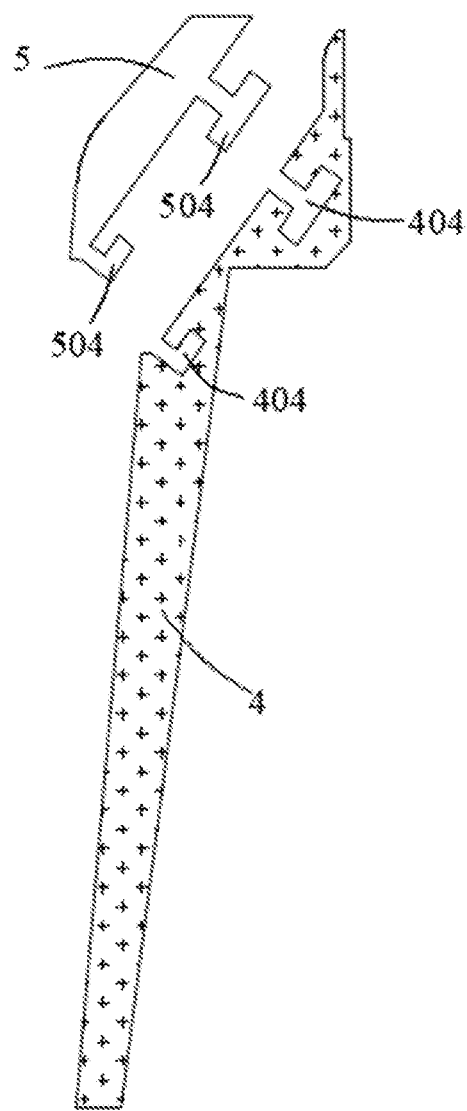
FIG. 10 is an exploded schematic diagram of the structure shown in FIG. 9.

As shown in FIGS. 3-5, an inner side surface of the first frame body 4 may include a first slope 401. The inner side surface of the first frame body 4 is a side surface of the first frame body 4 facing the light source 3. An included angle between the first slope 401 and the bottom wall 101 of the backplate 1 may be an obtuse angle. In other embodiments of the present disclosure, the included angle between the first slope 401 and the bottom wall 101 of the backplate 1 may also be a right angle or an acute angle. In addition, as shown in FIGS. 9 and 10, the first slope 401 may be provided with a recessed portion 404. A number of the recessed portions 404 may be one, two, three, four or more. A cross-sectional area of a lower portion of the recessed portion 404 may be greater than a cross-sectional area of an upper portion of the recessed portion 404.

As shown in FIGS. 3 and 4, the inner side surface of the first frame body 4 may further include a second slope 402. In a thickness direction of the bottom wall 101 of the backplate 1, the second slope 402 may be located between the first slope 401 and the bottom wall 101 of the backplate 1. In a direction parallel to the bottom wall 101 of the backplate 1, the first slope 401 may be located on a side of the second slope 402 away from the light source 3. An included angle γ between the second slope 402 and the bottom wall 101 of the backplate 1 may be an obtuse angle, and certainly, the included angle γ between the second slope 402 and the bottom wall 101 of the backplate 1 may also be a right angle or an acute angle. For example, the included angle between the first slope 401 and the bottom wall 101 of the backplate 1 is an obtuse angle, and the included angle between the second slope 402 and the bottom wall 101 of the backplate 1 is an obtuse angle, the included angle between the first slope 401 and the bottom wall 101 of the backplate 1 may be greater than the included angle between the second slope 402 and the bottom wall 101 of the backplate 1, but the disclosure is not limited thereto, the included angle between the first slope 401 and the bottom wall 101 of the backplate 1 may also be smaller than or equal to the included angle between the second slope 402 and the bottom wall 101 of the backplate 1. As shown in FIG. 5, the inner side surface of the first frame body 4 may further include a connecting surface 403. The connecting surface 403 may be connected between the first slope 401 and the second slope 402. The connecting surface 403 may be a flat surface, and the connecting surface 403 may be parallel or substantially parallel to the bottom wall 101 of the backplate 1. In other embodiments of the present disclosure, the connecting surface 403 may also be a slope or a curved surface.

For example, in a thickness direction of the bottom wall 101 of the backplate 1, the first frame body 4 may include a first frame section and a second frame section, and the second frame section is located between the first frame section and the bottom wall 101 of the backplate 1; the first frame section includes an annular structure, the second frame section includes an annular structure, the first slope 401 is an inner side surface of the first frame section, and the second slope 402 is an inner side surface of the second frame section.

Figure 6:
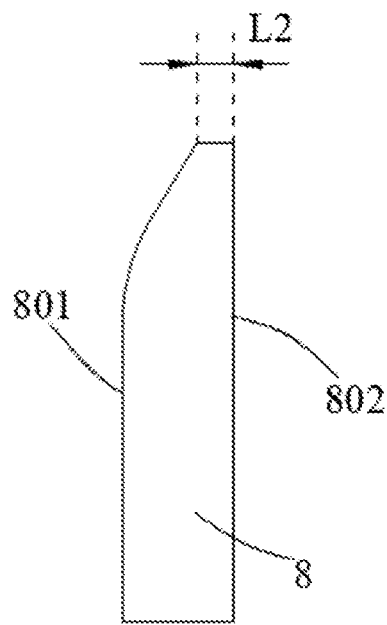
FIG. 6 is a schematic diagram of a support portion according to an embodiment of the present disclosure.

In addition, as shown in FIGS. 4 and 6, one end of the first frame body 4 away from the bottom wall 101 of the backplate 1 is provided with a support portion 8. The support portion 8 is configured to support the display panel 7. Taking the first frame body 4 including the annular structure as an example, the support portion 8 may also include an annular structure. The support portion 8 may include a first surface 801 facing the light source 3 and a second surface 802 facing away from the light source 3. The first surface 801 may be connected to the first slope 401. The second surface 802 may be disposed vertically, that is, the second surface 802 may be perpendicular to the bottom wall 101 of the backplate 1. A side of the first surface 801 close to the display panel 7 may be bent toward the second surface 802, that is, a distance between the first surface 801 and the second surface 802 gradually decreases along a direction toward the display panel 7, so that a distance between a display area of the display panel 7 and the support portion 8 may be increased to prevent edge pixels from being blocked. A bent portion and a non-bent portion of the first surface 801 may be smoothly and transitionally connected. In addition, a distance L2 between a side of the first surface 801 close to the display panel 7 and a side of the second surface 802 close to the display panel 7 may range between 0.2 mm-0.5 mm.

Figure 7:
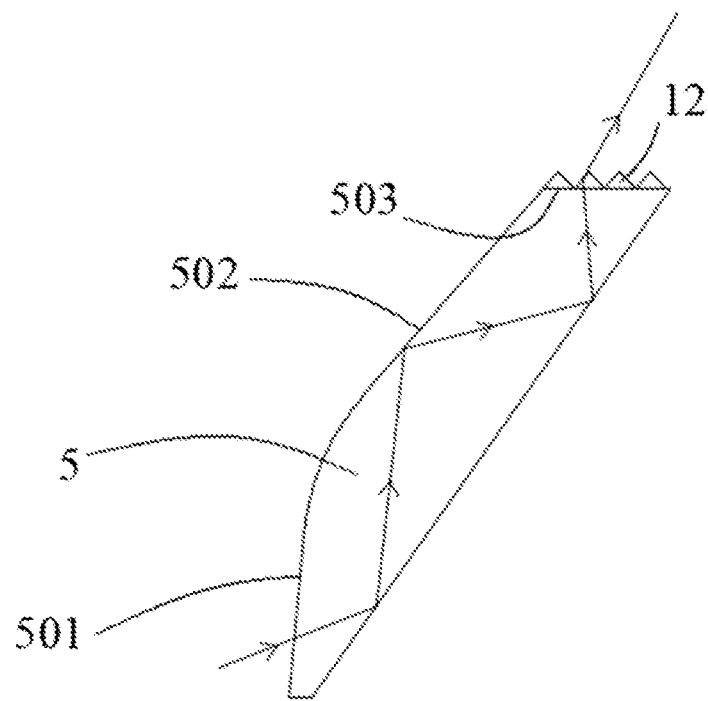
FIG. 7 is a schematic diagram of a second frame body according to an embodiment of the present disclosure.
Figure 13:
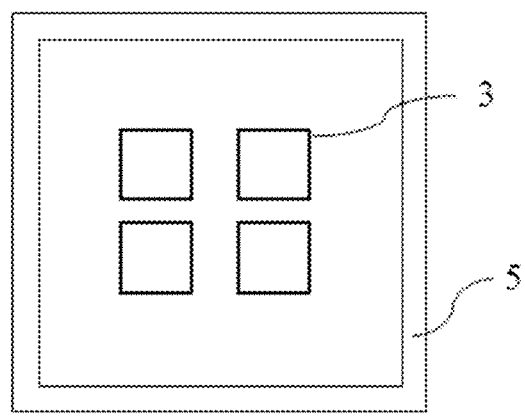
FIG. 13 is a schematic plan view illustrating a second frame body and a light source according to an embodiment of the present disclosure.

As shown in FIGS. 3, 4, and 7, the middle frame may further include a second frame body 5. The second frame body 5 may be disposed on an inner side surface of the first frame body 4. Taking the inner side surface of the first frame body 4 including the first slope 401 as an example, the second frame body 5 may be disposed on the first slope 401, that is, the second frame body 5 is disposed on the inner side surface of the first frame section. The second frame body 5 may be bonded to the first slope 401, for example, the second frame body 5 is bonded to the first slope 401 by a double-sided adhesive. Taking the first slope 401 being provided with the recessed portion 404 as an example, the second frame body 5 may be provided with a protruding portion 504, and the protruding portion 504 may be engaged with the recessed portion 404 on the first slope 401. Taking a plurality of recessed portions 404 as an example, there may also be a plurality of protruding portions 504, and the plurality of the protruding portions 504 may be engaged with the plurality of recessed portions 404 in one-to-one correspondence. In addition, the second frame body 5 can also fit with the connecting surface 403, so that the second frame body 5 can be more firmly arranged on the first slope 401. As shown in FIG. 13, the second frame body 5 may also include an annular structure, and an orthographic projection of the second frame body 5 on the bottom wall 101 of the backplate 1 may surround the light source 3. The second frame body 5 may include a transparent structure, and may be made of a transparent plastic material, such as Polymethyl Methacrylate (PMMA), Polycarbonate (PC), or the like.

In addition, as shown in FIGS. 4 and 7, a side of the second frame body 5 facing away from the first slope 401 includes a third slope 501 and a fourth slope 502. The third slope 501 may be connected to the second slope 402. Further, the third slope 501 may be coplanar with the second slope 402. An included angle between the third slope 501 and the bottom wall 101 of the backplate 1 may be different from an included angle between the fourth slope 502 and the bottom wall 101 of the backplate 1, and the third slope 501 may be smoothly transitionally connected to the fourth slope 502. The fourth slope 502 may be parallel to the first slope 401, and certainly, may also be not parallel to the first slope 401. The included angle between the fourth slope 502 and the bottom wall 101 of the backplate 1 may be an obtuse angle.

As shown in FIGS. 4 and 7, one end of the second frame body 5 facing away from the bottom wall 101 of the backplate 1 is provided with a support surface 503. The support surface 503 may be connected between the fourth slope 502 and the first slope 401. The support surface 503 may be parallel to the bottom wall 101 of the backplate 1, but the disclosure is not limited thereto. Taking the second frame body 5 including an annular structure as an example, the support surface 503 may be annular. A distance L1 between a boundary of the support surface 503 close to the light source 3 and a boundary of the support surface 503 away from the light source 3 may ranges between 2 mm-3.5 mm, for example, 2 mm, 2.5 mm, 3 mm, 3.5 mm, and the like. Taking the support surface 503 being annular as an example, the boundary of the support surface 503 close to the light source 3 is an inner boundary of the support surface 503, and the boundary of the support surface 503 away from the light source 3 is an outer boundary of the support surface 503.

Figure 8:
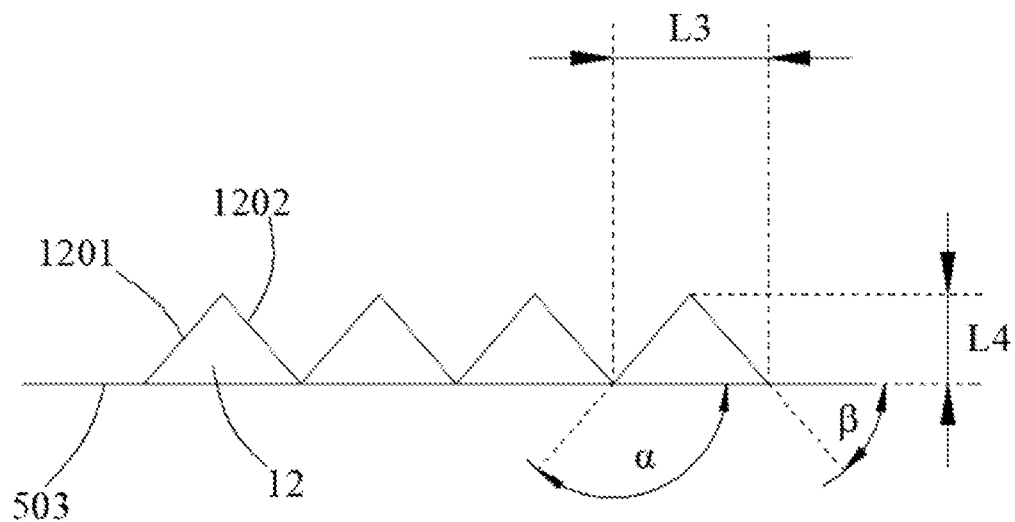
FIG. 8 is a schematic diagram of protrusions according to an embodiment of the present disclosure.
Figure 12:
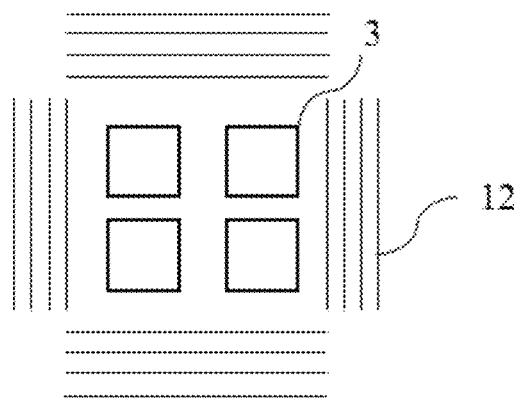
FIG. 12 is a schematic plan view illustrating a protrusion of a second frame body and a light source according to an embodiment of the present disclosure.

In another embodiment of the present disclosure, as shown in FIGS. 7 and 8, the support surface 503 may be provided with a protrusion 12. The protrusion 12 includes a first side surface 1201 facing the light source 3 and a second side surface 1202 facing away from the light source 3. An included angle α between the first side surface 1201 and the bottom wall 101 of the back plate 1 may be an obtuse angle, for example, 120°-150°, and more specifically, 120°, 130°, 140°, 150°, etc. An included angle β between the second side surface 1202 and the bottom wall 101 of the back plate 1 may be an acute angle, for example, 30°-60°, more specifically, 30°, 40°, 50°, 60°, etc. The first surface 1201 may be connected to the second side surface 1202. As shown in FIG. 12, the protrusion 12 may be strip-shaped and extend along periphery of the light source 3, and the first side surface 1201 and the second side surface 1202 may be two side surfaces in a width direction of the protrusion 12. In addition, taking the support surface 503 being annular as an example, the protrusion 12 may be an annular protrusion, and an orthographic projection of the annular protrusion on the bottom wall 101 of the backplate 1 may surround the light source 3. A height L4 of the protrusion 12 may range between 50 μm-200 μm, such as 50 μm, 100 μm, 150 μm, 200 μm, etc. A width L3 of the protrusion 12 may range between 50 μm-400 μm, such as 50 μm, 180 μm, 250 μm, 400 μm, 500 μm, etc. In addition, there may be a plurality of protrusions 12, for example, the protrusions 12 are annular protrusions, and the plurality of protrusions 12 are sequentially disposed along a direction away from the light source 3. As shown in FIG. 7, when the light reflected multiple times passes through the first side surface 1201 of the protrusion 12, the light will be refracted, and since the included angle between the first side surface 1201 and the bottom wall 101 of the backplate 1 is an obtuse angle, the refracted light can be emitted towards an edge of the backlight module, thereby further improving the edge brightness. In addition, a material of the protrusion 12 may be same as the material of the second frame body 5, but the present disclosure is not particularly limited thereto. The protrusion 12 may be integrated with the second frame body 5, but the disclosure is not limited thereto.

As shown in FIG. 3, the optical film layer 6 is supported at an end of the second frame body 5 away from the bottom wall 101. The optical film layer 6 can be supported on the support surface 503 of the second frame body 5, so that the light emitted by the light source 3 can reach an area of the optical film layer 6 supported by the second frame body 5 after passing through the second frame body 5. Taking the second frame body 5 including an annular structure as an example, an edge region of the optical film layer 6 may be supported at an end of the second frame body 5 away from the bottom wall 101. Taking the support surface 503 of the second frame body 5 provided with the protrusions 12 as an example, the optical film layer 6 may be disposed on the plurality of protrusions 12. The backlight module may further include a front frame 11. The front frame 11 may be disposed outside the middle frame. Further, the front frame 11 may be disposed outside the side wall 102 of the backplate 1 and may be connected to the side wall 102 of the backplate 1 through a screw 10. The optical film layer 6 may include a diffuser plate. The diffuser plate may be disposed opposite to the display panel 7. A material of the diffuser plate may include polystyrene (PS), but the present disclosure is not limited thereto. The optical film layer 6 may further include a diffuser sheet. The diffuser sheet may be located between the diffuser plate and the display panel 7.

Figure 11:
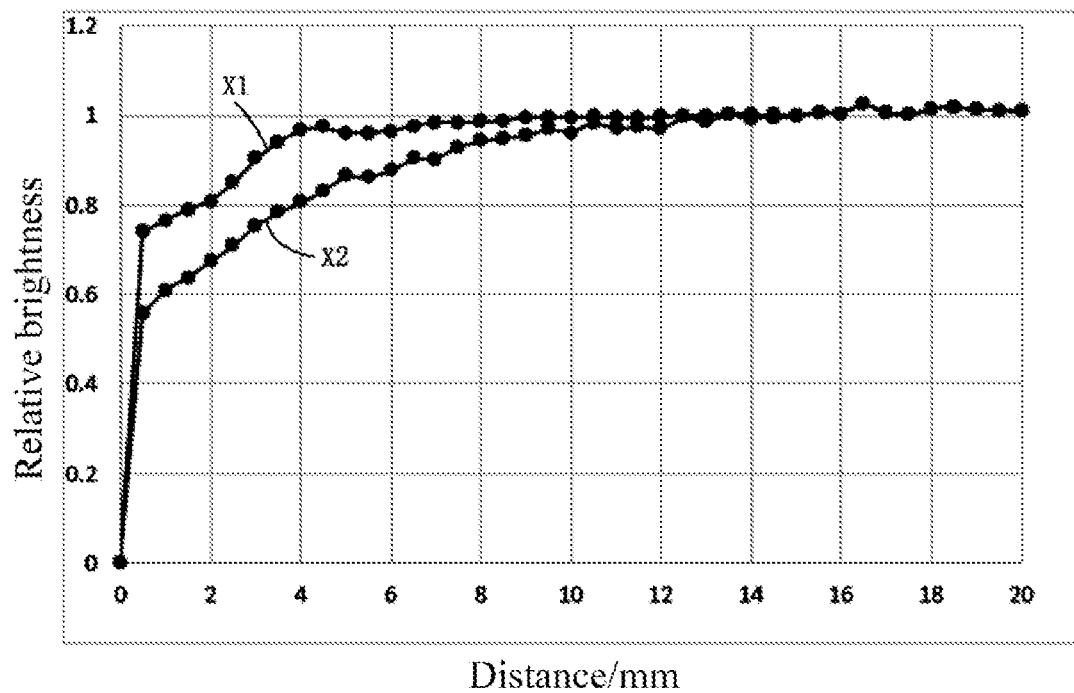
FIG. 11 is a brightness curve of a display device.

Embodiments of the present disclosure further provide a display device. The display device may include a display panel 7 and the backlight module as described in any of the above embodiments. The display panel 7 may be disposed on a side of the optical film layer 6 facing away from the bottom wall 101 of the backplate 1, and is supported by the support portion 8, and the front frame 11 may be bonded to the display panel 7 through an adhesive 9. The display panel 7 may be a liquid crystal display panel, and may include: an array substrate and a color filter substrate that are cell-assembled, and a liquid crystal layer located between the array substrate and the color filter substrate. As shown in FIG. 11, X1 is a brightness curve of the display device of the present disclosure, X2 is a brightness curve of the display device adopting the structure shown in FIG. 1, the abscissa represents a distance from a position in a display area of the display panel 7 to an edge of the display area, and the ordinate represents a ratio of the brightness at the position to the relative brightness of a central area of the picture. It can be seen that, by applying the technical solution of the present disclosure, brightness difference between a periphery and a central area of the display device is reduced, and the brightness enhancement effect is obvious. Since the backlight module included in the display device of the embodiment of the present disclosure is same as the backlight module in the above-described backlight module embodiments, beneficial effects thereof are same, and details will not be repeated herein.

Embodiments of the present disclosure further provide an assembled display device. The assembled display device may be formed by assembling a plurality of display devices in the above embodiments. Since the display device included in the assembled display device of the embodiment of the present disclosure is same as the display device in the above-described display device embodiments, beneficial effects thereof are same, and details will not be repeated herein.

The above are only preferred embodiments of the present disclosure, and they do not limit the present disclosure in any form. Although the present disclosure has been disclosed in the preferred embodiments, they are not used to limit the present disclosure. Any person familiar with this profession can make some changes or modify it into an equivalent embodiment by using the technical content disclosed above without departing from the scope of the technical solution of the present disclosure. So long as the content does not depart from the technical solution of the present disclosure, any simple modifications, equivalent changes or modifications made to the above embodiments according to the technical essence of the present disclosure belong to the scope of the technical solution of the present disclosure.

The invention claimed is:

1. A backlight module, comprising:
a backplate, comprising a bottom wall;
a light source, disposed on the bottom wall;
an optical film layer, disposed opposite to the bottom wall and located on a light emitting side of the light source; and
a middle frame, comprising a first frame body and a second frame body, wherein the first frame body is arranged around a periphery of the bottom wall, the second frame body is arranged on an inner side surface of the first frame body, and the second frame body comprises a transparent structure; and the optical film layer is supported at one end of the second frame body away from the bottom wall,
wherein the inner side surface of the first frame body comprises a first slope, an included angle between the first slope and the bottom wall of the backplate is an obtuse angle, and the second frame body is disposed on the first slope,
wherein the inner side surface of the first frame body further comprises a second slope, the second slope is located between the first slope and the bottom wall of the backplate, an included angle between the second slope and the bottom wall of the backplate is an obtuse angle, and the included angle between the second slope and the bottom wall of the backplate is smaller than the included angle between the first slope and the bottom wall of the backplate, and
wherein a side of the second frame body facing away from the first slope comprises: a third slope, connected to the second slope and being coplanar with the second slope; a fourth slope, an included angle between the fourth slope and the bottom wall of the backplate being greater than an included angle between the third slope and the bottom wall of the backplate; and a support surface, provided at the end of the second frame body away from the bottom wall of the backplate, wherein the support surface extends towards the first slope, is connected between the fourth slope and the first slope, and is parallel to the bottom wall of the backplate.

2. The backlight module according to claim 1, wherein the second frame body is bonded to the first slope.

3. The backlight module according to claim 1, wherein the first slope is provided with a recessed portion, the second frame body is provided with a protruding portion, and the protruding portion is engaged with the recessed portion.

4. The backlight module according to claim 1, wherein in a direction parallel to the bottom wall of the backplate, the first slope is located on a side of the second slope away from the light source; the inner side surface of the first frame body further comprises a connecting surface connecting the first slope and the second slope, and the connecting surface is parallel to the bottom wall of the backplate; and the second frame body fits with the connecting surface.

5. The backlight module according to claim 1, wherein the optical film layer is supported on the support surface; and the second frame body further comprises:
a protrusion, disposed on the support surface, wherein the protrusion comprises a first side surface facing the light source and a second side surface facing away from the light source, an included angle between the first side surface and the bottom wall of the backplate is an obtuse angle, and an included angle between the second side surface and the bottom wall of the backplate is an acute angle.

6. The backlight module according to claim 5, wherein the included angle between the first side surface and the bottom wall of the backplate ranges between 120°-150°.

7. The backlight module according to claim 5, wherein the protrusion is strip-shaped and extends along a periphery of the light source.

8. The backlight module according to claim 7, wherein a height of the protrusion ranges between 50 μm-200 μm; and/or
a width of the protrusion ranges between 50 μm-400 μm.

9. The backlight module according to claim 1, wherein the optical film layer is supported on the support surface; and a distance between a boundary of the support surface close to the light source and a boundary of the support surface away from the light source ranges between 2 mm-3.5 mm.

10. The backlight module according to claim 1, wherein the second frame body comprises an annular structure.

11. The backlight module according to claim 1, wherein a material of the second frame body comprises transparent plastic.

12. The backlight module according to claim 1, wherein an end of the first frame body away from the bottom wall of the backplate is provided with a support portion for supporting a display panel, and the support portion comprises a first surface facing the light source and a second surface facing away from the light source; and a side of the first surface close to the display panel is bent toward the second surface.

13. The backlight module according to claim 12, wherein a distance between the side of the first surface close to the display panel and a side of the second surface close to the display panel ranges between 0.2 mm-0.5 mm.

14. A display device, comprising:
   the backlight module according to claim 1; and
   a display panel, supported on the first frame body.

15. An assembled display device, formed by assembling a plurality of display devices according to claim 14.

* * * * *